(12) United States Patent
Sebes

(10) Patent No.: US 7,873,955 B1
(45) Date of Patent: Jan. 18, 2011

(54) SOLIDIFYING THE EXECUTABLE SOFTWARE SET OF A COMPUTER

(75) Inventor: E. John Sebes, Menlo Park, CA (US)

(73) Assignee: McAfee, Inc., Santa Clara, CA (US)

( * ) Notice: Subject to any disclaimer, the term of this patent is extended or adjusted under 35 U.S.C. 154(b) by 994 days.

(21) Appl. No.: 10/935,772

(22) Filed: Sep. 7, 2004

(51) Int. Cl.
*G06F 9/44* (2006.01)

(52) U.S. Cl. .................................... 717/168
(58) Field of Classification Search ................ 717/168
See application file for complete search history.

(56) References Cited

U.S. PATENT DOCUMENTS

| | | | |
|---|---|---|---|
| 4,688,169 A * | 8/1987 | Joshi ........................... 726/29 |
| 4,982,430 A * | 1/1991 | Frezza et al. ................. 380/211 |
| 5,155,847 A | 10/1992 | Kirouac et al. |
| 5,222,134 A * | 6/1993 | Waite et al. .................... 705/59 |
| 5,390,314 A * | 2/1995 | Swanson ..................... 717/138 |
| 5,521,849 A | 5/1996 | Adelson et al. ............. 364/570 |
| 5,560,008 A * | 9/1996 | Johnson et al. ................. 726/5 |
| 5,699,513 A | 12/1997 | Feigen et al. .......... 395/187.01 |
| 5,778,349 A * | 7/1998 | Okonogi ........................ 707/1 |
| 5,787,427 A | 7/1998 | Benantar et al. |
| 5,842,017 A * | 11/1998 | Hookway et al. ........... 717/158 |
| 5,907,709 A * | 5/1999 | Cantey et al. ............... 717/141 |
| 6,141,698 A | 10/2000 | Krishnan et al. ............ 709/331 |
| 6,192,401 B1 | 2/2001 | Modiri et al. |
| 6,275,938 B1 | 8/2001 | Bond et al. .................. 713/200 |
| 6,338,149 B1 | 1/2002 | Ciccone, Jr. et al. .......... 714/38 |
| 6,356,957 B2 * | 3/2002 | Sanchez et al. ............. 719/328 |
| 6,393,465 B2 | 5/2002 | Leeds .......................... 709/207 |
| 6,442,686 B1 | 8/2002 | McArdle et al. ............. 713/151 |
| 6,453,468 B1 | 9/2002 | D'Souza |
| 6,587,877 B1 | 7/2003 | Douglis et al. .............. 709/224 |
| 6,662,219 B1 | 12/2003 | Nishanov et al. |
| 6,748,534 B1 | 6/2004 | Gryaznov et al. |
| 6,769,008 B1 | 7/2004 | Kumar et al. |
| 6,769,115 B1 | 7/2004 | Oldman ...................... 717/126 |
| 6,832,227 B2 | 12/2004 | Seki et al. .................... 707/101 |
| 6,834,301 B1 | 12/2004 | Hanchett .................... 709/223 |
| 6,847,993 B1 | 1/2005 | Novaes et al. |
| 6,918,110 B2 | 7/2005 | Hundt et al. ................. 717/158 |
| 6,930,985 B1 | 8/2005 | Rathi et al. .................. 370/254 |
| 6,988,101 B2 | 1/2006 | Ham et al. .................... 707/10 |

(Continued)

OTHER PUBLICATIONS

U.S. Appl. No. 11/379,953, entitled "Software Modification by Group to Minimize Breakage," filed Apr. 24, 2006, Inventor(s): E. John Sebes et al.

(Continued)

*Primary Examiner*—Kambiz Zand
*Assistant Examiner*—Stephen Sanders
(74) *Attorney, Agent, or Firm*—Patent Capital Group

(57) ABSTRACT

System and method for solidifying (or "freezing") the set of software and configuration data available for execution on a computer. Any additional software installed on the computer after the solidification process will not execute, regardless of whether the installation is initiated or otherwise performed by a person with administrative privilege. The ability to allow new or modified software to execute on the computer rests with an integrity server separate from and outside of the solidified computer. The solidification of software and configuration data proceeds on a level of granularity selectable by the integrity server and any operators thereof.

18 Claims, 6 Drawing Sheets

U.S. PATENT DOCUMENTS

| | | | |
|---|---|---|---|
| 6,988,124 B2 | 1/2006 | Douceur et al. | |
| 7,010,796 B1 | 3/2006 | Strom et al. | |
| 7,039,949 B2 | 5/2006 | Cartmell et al. | |
| 7,065,767 B2 | 6/2006 | Kambhammettu et al. | 719/310 |
| 7,082,456 B2 | 7/2006 | Mani-Meitav et al. | 709/203 |
| 7,093,239 B1 | 8/2006 | van der Made | |
| 7,124,409 B2 | 10/2006 | Davis et al. | |
| 7,139,916 B2 | 11/2006 | Billingsley et al. | 713/182 |
| 7,152,148 B2 | 12/2006 | Williams et al. | |
| 7,159,036 B2 | 1/2007 | Hinchliffe et al. | |
| 7,177,267 B2 | 2/2007 | Oliver et al. | 370/216 |
| 7,203,864 B2 | 4/2007 | Goin et al. | |
| 7,251,655 B2 | 7/2007 | Kaler et al. | 707/9 |
| 7,290,266 B2 | 10/2007 | Gladstone et al. | |
| 7,302,558 B2 | 11/2007 | Campbell et al. | 713/1 |
| 7,330,849 B2 | 2/2008 | Gerasoulis et al. | |
| 7,350,204 B2 | 3/2008 | Lambert et al. | |
| 7,353,501 B2 | 4/2008 | Tang et al. | 717/130 |
| 7,363,022 B2 | 4/2008 | Whelan et al. | 455/411 |
| 7,370,360 B2 | 5/2008 | van der Made | |
| 7,406,517 B2 | 7/2008 | Hunt et al. | |
| 7,441,265 B2 | 10/2008 | Staamann et al. | |
| 7,506,170 B2 | 3/2009 | Finnegan | |
| 7,607,170 B2 | 10/2009 | Chesla | |
| 7,657,599 B2 | 2/2010 | Smith | |
| 7,698,744 B2 | 4/2010 | Fanton et al. | |
| 2002/0099671 A1 | 7/2002 | Crosbie et al. | 705/500 |
| 2003/0073894 A1 | 4/2003 | Chiang et al. | 600/407 |
| 2003/0074552 A1 | 4/2003 | Olkin et al. | 713/150 |
| 2003/0120601 A1 | 6/2003 | Ouye et al. | |
| 2003/0120811 A1 | 6/2003 | Hanson et al. | 709/245 |
| 2003/0120935 A1 | 6/2003 | Teal et al. | 713/188 |
| 2004/0003258 A1 | 1/2004 | Billingsley et al. | |
| 2004/0015554 A1 | 1/2004 | Wilson | 709/206 |
| 2004/0051736 A1 | 3/2004 | Daniell | 345/752 |
| 2004/0054928 A1 | 3/2004 | Hall | |
| 2004/0143749 A1 | 7/2004 | Tajalli et al. | |
| 2004/0167906 A1 | 8/2004 | Smith et al. | |
| 2004/0230963 A1 | 11/2004 | Rothman et al. | 717/168 |
| 2004/0255161 A1 | 12/2004 | Cavanaugh | 713/201 |
| 2005/0018651 A1 | 1/2005 | Yan et al. | 370/352 |
| 2005/0108562 A1 | 5/2005 | Khazan et al. | |
| 2005/0114672 A1 | 5/2005 | Duncan et al. | |
| 2005/0228990 A1 | 10/2005 | Kato et al. | 713/167 |
| 2005/0262558 A1 | 11/2005 | Usov | |
| 2005/0273858 A1 | 12/2005 | Zadok et al. | |
| 2006/0015501 A1 | 1/2006 | Sanamrad et al. | |
| 2006/0080656 A1 | 4/2006 | Cain et al. | |
| 2006/0236398 A1 | 10/2006 | Trakic et al. | |
| 2007/0039049 A1 | 2/2007 | Kupferman et al. | |
| 2007/0083522 A1 | 4/2007 | Nord et al. | |
| 2007/0101435 A1 | 5/2007 | Konanka et al. | |

OTHER PUBLICATIONS

U.S. Appl. No. 11/277,596, entitled "Execution Environment File Inventory," filed Mar. 27, 2006, Inventor(s): Rishi Bhargava et al.
U.S. Appl. No. 10/651,591, entitled "Method and System for Containment of Networked Application Client Software by Explicit Human Input," filed Aug. 29, 2003, Inventor(s): Rosen Sharma et al.
U.S. Appl. No. 10/806,578, entitled Containment of Network communication, filed Mar. 22, 2004, Inventor(s): E. John Sebes et al.
U.S. Appl. No. 10/739,230, entitled "Method and System for Containment of Usage of Lanaugage Interfaces," filed Dec. 17, 2003, Inventor(s): Rosen Sharma et al.
U.S. Appl. No. 11/060,683, entitled "Distribution and Installation of Solidified Software on a Computer," filed Feb. 16, 2005, Inventor(s): Bakul Shah et al.
U.S. Appl. No. 11/122,872, entitled "Piracy Prevention Using Unique Module Translation," filed May 4, 2005, Inventor(s): E. John Sebes et al.
U.S. Appl. No. 11/346,741, entitled "Enforcing Alignment of Approved Changes and Deployed Changes in the Software Change Life-Cycle," filed Feb. 2, 2006, Inventor(s): Rahul Roy-Chowdhury et al.
U.S. Appl. No. 11/182,320, entitled "Classification of Software on Networked Systems," filed Jul. 14, 2005, Inventor(s): E. John Sebes et al.
U.S. Appl. No. 11/400,085, entitled "Program-Based Authorization," filed Apr. 7, 2006, Inventor(s): Rishi Bhargava et al.
U.S. Appl. No. 11/437,317, entitled "Connectivity-Based Authorization," filed May 18, 2006, Inventor(s): E. John Sebes et al.
U.S. Appl. No. 12/290,380, entitled "Application Change Control," filed Oct. 29, 2008, Inventor(s): Rosen Sharma et al.
U.S. Appl. No. 12/008,274, entitled Method and Apparatus for Process Enforced Configuration Management, filed Jan. 9, 2008, Inventor(s): Rishi Bhargava et al.
U.S. Appl. No. 12/291,232, entitled "Method of and System for Computer System State Checks," filed Nov. 7, 2008, inventor(s): Rishi Bhargava et al.
U.S. Appl. No. 12/322,220, entitled "Method of and System for Malicious Software Detection Using Critical Address Space Protection," filed Jan. 29, 2009, Inventor(s): Suman Saraf et al.
U.S. Appl. No. 12/322,321, entitled "Method of and System for Computer System Denial-of-Service Protection," filed Jan. 29, 2009, Inventor(s): Suman Saraf et al.
U.S. Appl. No. 12/426,859, entitled "Method of and System for Reverse Mapping Vnode Pointers," filed Apr. 20, 2009, Inventor(s): Suman Saraf et al.
U.S. Appl. No. 12/545,609, entitled "System and Method for Enforcing Security Policies in a Virtual Environment," filed Aug. 21, 2009, Inventor(s): Amit Dang et al.
U.S. Appl. No. 12/545,745, entitled "System and Method for Providing Address Protection in a Virtual Environment," filed Aug. 21, 2009, Inventor(s): Preet Mohinder.
Eli M. Dow, et al., "The Xen Hypervisor," INFORMIT, dated Apr. 10, 2008, http://www.informit.com/articles/printerfriendly.aspx?p=1187966, printed Aug. 11, 2009 (13 pages).
"Xen Architecture Overview," Xen, dated Feb. 13, 2008, Version 1.2, http://wiki.xensource.com/xenwiki/XenArchitecture?action=AttachFile&do=get&target=Xen+architecture_Q1+2008.pdf, printed Aug. 18, 2009 (9 pages).
U.S. Appl. No. 12/551,673, entitled "Piracy Prevention Using Unique Module Translation," filed Sep. 1, 2009, Inventor(s): E. John Sebes et al.
U.S. Appl. No. 12/615,521, entitled "System and Method for Preventing Data Loss Using Virtual Machine Wrapped Applications," filed Nov. 10, 2009, Inventor(s): Sonali Agarwal, et al.
Desktop Management and Control, Website: http://www.vmware.com/solutions/desktop/, printed Oct. 12, 2009, 1 page.
Secure Mobile Computing, Website: http://www.vmware.com/solutions/desktop/mobile.html, printed Oct. 12, 2009, 2 pages.
U.S. Appl. No. 12/636,414, entitled "System and Method for Managing Virtual Machine Configurations," filed Dec. 11, 2009, Inventor(s): Harvinder Singh Sawhney, et al.
U.S. Appl. No. 12/640,098 entitled "Enforcing Alignment of Approved Changes and Deployed Changes in the Software Change Life-Cycle," filed Dec. 17, 2009, Inventor(s): Rahul Roy-Chowdhury, et al.
U.S. Appl. No. 12/839,856, entitled "Containment of Network Communication," filed Jul. 20, 2010, Inventor(s) E. John Sebes, et al.
U.S. Appl. No. 12/844,892, entitled "System and Method for Protecting Computer Networks Against Malicious Software," filed Jul. 28, 2010, Inventor(s) Rishi Bhargava, et al.
U.S. Appl. No. 12/844,964, entitled "System and Method for Network Level Protection Against Malicious Software," filed Jul. 28, 2010, Inventor(s) Rishi Bhargava, et al.

* cited by examiner

|  | Syscalls API | System config data (e.g. Win registry) | Language API$_1$ | Language API$_2$ | Software Application1 config data | Software Application2 config data | Mode |
|---|---|---|---|---|---|---|---|
| All Interfaces Frozen | frozen | frozen | frozen | frozen | frozen | frozen | <value> |
| All Interfaces Thawed | thawed | thawed | thawed | thawed | thawed | thawed | <value> |
| Software Maintenance | frozen | frozen | frozen | frozen | thawed | thawed | <value> |

Figure 2

SOLIDIFYING THE EXECUTABLE SOFTWARE SET OF A COMPUTER

BACKGROUND

1. Field

Invention relates generally to computer systems, and in particular to fixing the set of software available for execution on a computer.

2. Related Art

The set of software available for execution on a computer is generally dynamic to and modifiable, even when such modification is not desirable. Restricting the ability of users or administrators of a computer to install and remove software or to modify configuration of the existing software is enforced with passwords or verbal and written policies and guidelines. However, when passwords are used, possessors of administrative passwords generally have access beyond their immediate responsibilities.

Accordingly, there is a need for a technique that allows the solidification (or "freezing") of the set of software available for execution on a computer, wherein the software is solidified according to a granular policy, and wherein the ability to change such a policy resides outside of the solidified computer.

SUMMARY

System and method for solidifying (or "freezing") the set of software and configuration data available for execution on a computer. Any additional software installed on the computer after the solidification process will not execute, regardless of whether the installation is initiated or otherwise performed by a person with administrative privilege. The ability to allow new or modified software to execute on the computer rests with an integrity server separate from and outside of the solidified computer. The solidification of software and configuration data proceeds on a level of granularity selectable by the integrity server and any operators thereof.

BRIEF DESCRIPTION OF DRAWINGS

FIG. 2 is a block diagram illustrating a mapping table comprising one or more name space translations corresponding to one or more interfaces, according to an embodiment of the present invention.

DETAILED DESCRIPTION

The following serves as a glossary of terms as used herein:

Computer: Any computing system comprising an operating system providing a set of resources for use by one or more pieces of software for execution on the computing system.

Software: Any set of instructions for execution on a computer. A piece of software may use one or more services or resources as provided by the computer through one or more interfaces.

Interface: A language, protocol or other boundary for providing a service or making available a resource to a piece of software on a computer. An interface comprises a name space, knowledge of which is needed for successful usage of the interface. For a given interface to a service or resource, an implementation of the service or resource fulfills requests made through the interface. One example of an interface comprises an Application Programming Interface (API) such as a system call interface of an operating system, wherein the name space comprises system call names or system call addresses, and the implementation comprises the portion of the operating system implementing the actual system calls. Another example of an interface comprises a set of function calls to a library, wherein the name space comprises function names or function addresses, and the implementation comprises the actual library code implementing the functions. Other interface examples include language APIs (such as a PERL API, Java API, PHP API, shell script APIs, etc.), database APIs, an interface to a file system of a computer (wherein the name space comprises a set of file names), and any interface to a container of data.

Invention operates in combination with a computer's operating system in order to solidify (or "freeze") the set of software available for execution on the computer. Any software, modified or installed on the computer after the solidification process, cannot be executed on the computer regardless of whether the modification or installation was initiated or otherwise performed by a person with administrative privilege or with access to passwords or other such credentials pertaining to the computer. The ability to enable modified or additional software to execute on the computer resides with an entity (herein called an "integrity server") outside of the solidified computer.

Figure 1:
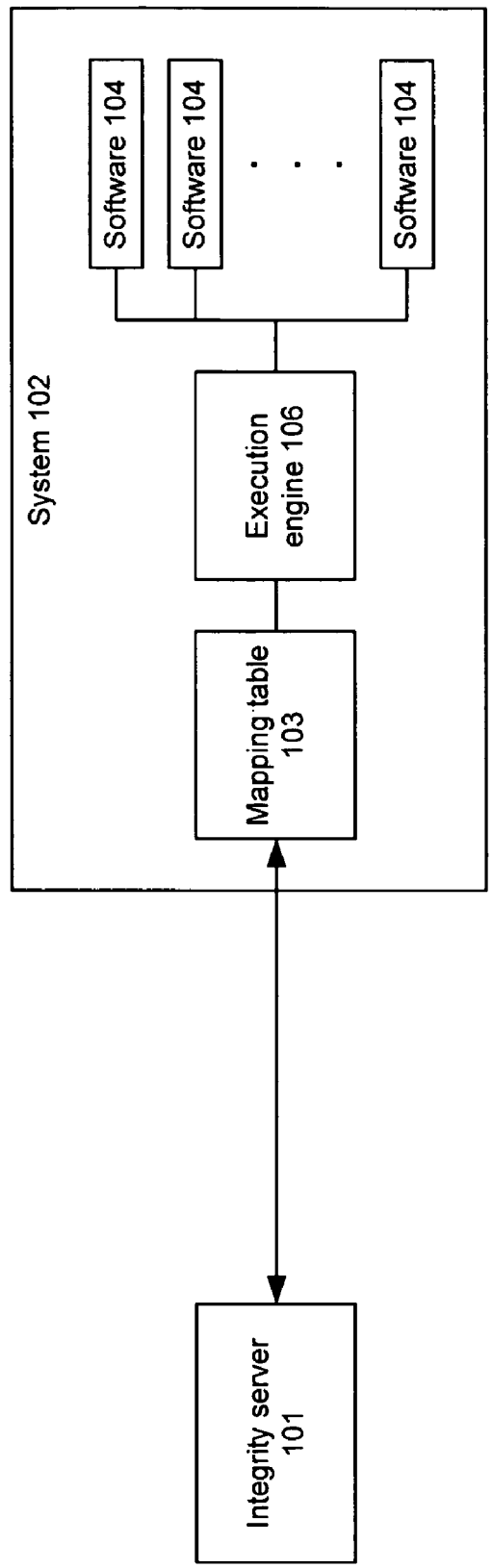
FIG. 1 is a block diagram illustrating an architecture for solidifying an executable software set of a computer, according to an embodiment of the present invention.

FIG. 1 illustrates an architecture for solidifying an executable software set of a computer, according to an embodiment of the present invention. Prior to a solidification (or "freezing") process, a computer 102 comprises an installed software base, for example as prepared by a manufacturer or seller of the computer 102. A user or an administrator of the computer 102 may have proper privilege to direct execution of such already installed programs, to inspect data on the computer 102 (such as log files or reports), to power-up or power-down the computer 102, or otherwise to make appropriate use of the computer 102 and its installed software base. However, once the software base of the computer 102 is solidified, such a user or administrator cannot modify or add to the set of software available for execution on the computer 102, since such ability resides with an integrity server 101 separate and distinct from the computer 102.

Prior to a solidification process, computer 102 makes one or more interfaces available to software modules for proper execution of said software modules on computer 102. A solidification of computer 102 comprises translating one or more of the interfaces provided by computer 102, such that software modules are no longer able to use the translated interfaces. In order to enable a software module to use the translated interfaces and properly execute on such a solidified computer 102, the software module is then translated according to the translated interfaces.

It is an advantageous aspect that individual interfaces can be independently to translated (hereinafter also referred to as "solidified" or "frozen") or left untranslated (hereinafter also referred to as "thawed"), thereby providing a level of granularity for the solidification process. FIG. 2 illustrates a set of example states for a solidified computer 102. The middle six columns represent a set of interfaces which individually can be frozen or thawed. The first row ("All Interfaces frozen") shows all interfaces of system 102 as frozen, and hence system 102 is completely solidified. The second row ("All Interfaces Thawed") shows all interfaces of system 102 as thawed, lifting protections provided by the solidification process. The third row ("Software Maintenance") shows all interfaces of system 102 translated except software configuration data. This row indicates a state for allowing a user of system 102 to locally change software configuration data (shown, as an illustrative example, for two individual software applications), as described in more detail below.

Figure 3:
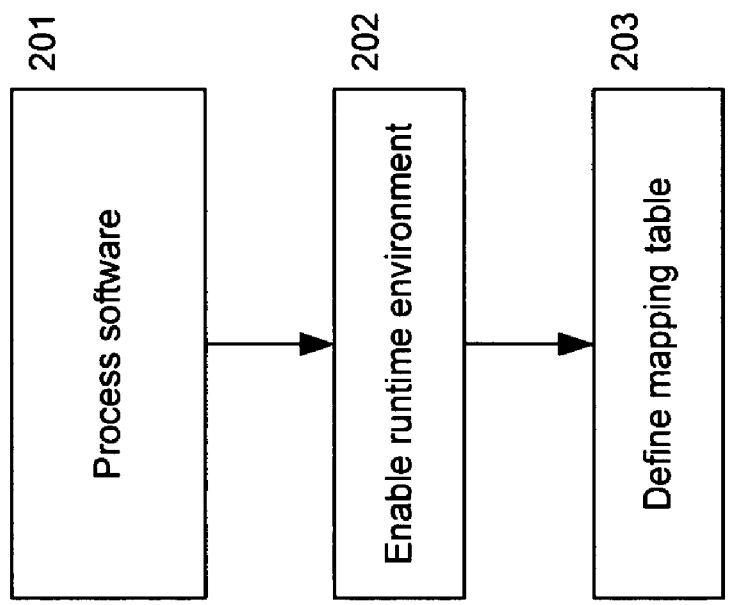
FIG. 3 is a block diagram illustrating a name space translation indicating a forward translation from an original name space to a translation name space, as well as a corresponding reverse translation, according to an embodiment of the present invention.

FIG. 3 is a flow diagram illustrating a method for preparing a computer 102 for operation in a solidified manner, according to an embodiment of the present invention. Existing software is processed 201 in anticipation for using one or more translated name spaces, the translated name spaces for referring to interfaces which are to be translated (i.e. "frozen"). Since said translated name spaces may not yet be defined, the processing step 201 comprises generating a set of placeholders for the software, such placeholders indicating that a reference name (at a given position in the software code), taken from an interface name space, is to be replaced with a corresponding translated name in a corresponding translated name space. Note that the actual translations need not yet be defined, and a placeholder indicates that a name n is to be replaced with a translation T(n), wherein T represents the actual translation once such a translation is defined (in step 203) by way of a mapping table. The set of placeholders resulting from the processing step 201, and associated with the corresponding software, is hereinafter referred to as an "sdiff".

In step 202, the runtime environment of computer 102 is modified such that a request to execute a piece of software results in an attempt to replace the corresponding placeholders (given by the corresponding sdiff) with translated names (according to the mapping table) prior to execution of the software. In one embodiment, this alteration is set to take effect at the next boot-up of computer 102. In another embodiment, the alteration takes effect before the next boot-up of computer 102. In step 203, a mapping table is defined for use by the altered runtime environment. Hereinafter, two "modes" are identified for the runtime environment of computer 102: a "restricted mode" wherein the runtime environment of computer 102 attempts to replace placeholders in a piece of software (according to a corresponding sdiff, if such exists) and use a mapping table in order to execute the software, and an "unrestricted mode" wherein the runtime environment of computer 102 simply executes software without using any sdiffs or any mapping tables.

Figure 4:
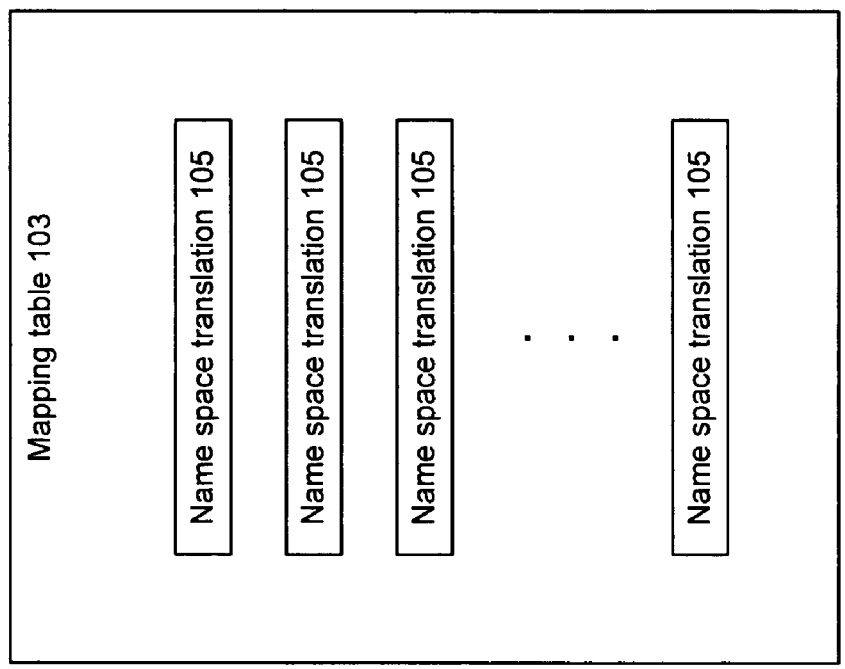
FIG. 4 is a block diagram illustrating an example set of possible states for a solidified computer, according to an embodiment of the present invention.
Figure 5:
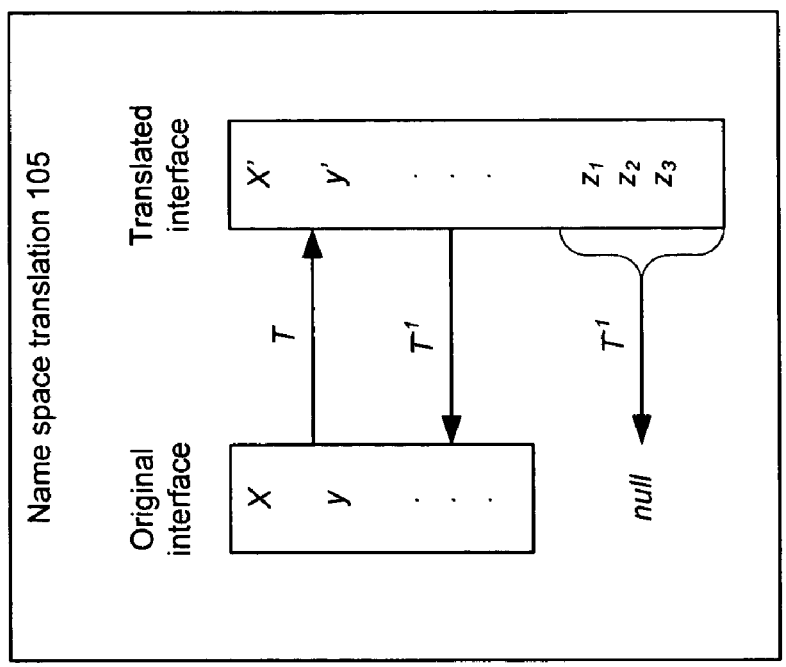
FIG. 5 is a block diagram illustrating a name space translation indicating a forward translation T from an original name space to a translation name space, as well as a corresponding reverse translation $T^{-1}$, according to an embodiment of the present invention.

FIG. 4 is a block diagram illustrating a mapping table 103, according to an embodiment of the present invention. Mapping table 103 comprises one or more name space translations 105 corresponding to one or more interfaces. As shown in FIG. 5, a name space translation 105 indicates a forward translation T from an original name space to a translation name space, as well as a corresponding reverse translation $T^1$. The translation name space preferably is larger than the original name space, the size increase serving as a precaution against any attempts to recover the name space translation by guessing.

In the example name space translation 105 shown in FIG. 5, names from an original name space A are translated into names taken from a translation name space A', with two example names x and y from the original name space A shown as translated into names x' and y' from the translated name space A'. Note that in general the reverse translation $T^1$ need not map every unique name from the translation name space A' into a corresponding unique name in the original name space A. For example, a group of names from the translation name space A' (indicated by $z_1$, $z_2$ and $z_3$ in FIG. 5) may be mapped into a null value in the original name space A. This will occur for example when the translation name space is larger than the original name space. Specifically, the translation name space A' preferably comprises the names in A as a subset, such names mapped back to null by the reverse translation $T^1$, thereby in effect thwarting attempts to use the original untranslated names in A on a solidified system 102. Additionally, the translation name space A' preferably comprises a large number of names which are neither in A nor in T(A) (e.g. a large number of randomly generated names or name ranges), such names mapped back to null by the reverse translation $T^1$, thereby thwarting any attempt to guess which names in A' map back to the original translated names in A.

Figure 6:
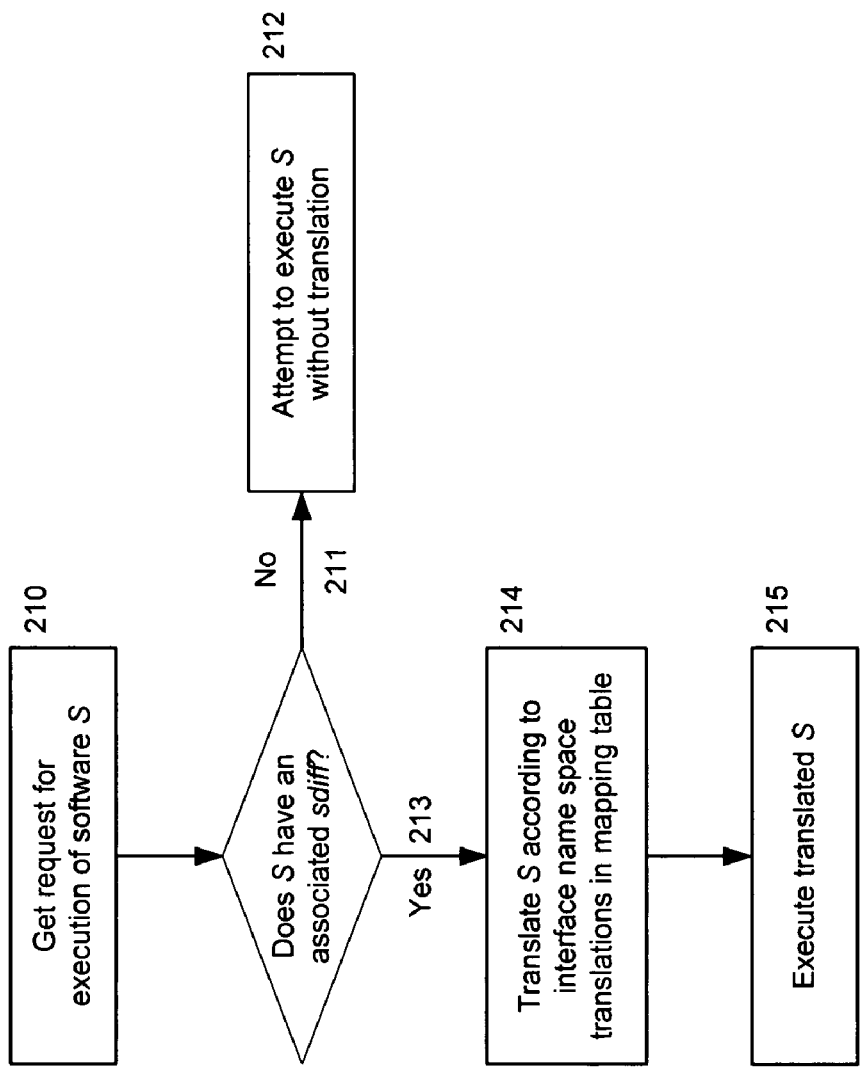
FIG. 6 is a flow diagram illustrating a method for executing a piece of software on a solidified computer, according to an embodiment of the present invention.

FIG. 6 is a flow diagram illustrating a method for executing a piece of software on a solidified computer 102, according to an embodiment of the present invention. Receive 210 a request for execution of a piece of software S. If S does not 211 have an associated sdiff, attempt 212 to execute S without translating S. Otherwise 213, translate 214 S according to one or more respective interface name space translations 105 as indicated by the sdiff associated with S and according to the mapping table 103, and execute 215 the translated S. Step 214 preferably occurs during loading of the executable file, symbol resolution and/or dynamic linkage.

The execution steps 212 and 215 comprise an attempt to use appropriate reverse translations (as given by the mapping table 103) for any references to translated interfaces, whether the references (names) are appropriately translated or not. Therefore, if a software S does not have an associated sdiff, references comprising (untranslated) names for referring to a translated interface will be reverse-translated into invalid names, and will hence cause an execution exception, logging, and/or other error handling. The same applies to a piece of code which has been inserted into a software S after an sdiff has been generated for S in step 201. On the other hand, if a software S does have an associated sdiff, references comprising (translated) names for referring to a translated interface will be appropriately reverse-translated to corresponding original names for proper execution on solidified computer 102.

For a translated piece of software (comprising references according to a translated interface) to execute correctly, several techniques can be used independently or in combination. In a first embodiment, computer 102 comprises a translation of an implementation of the corresponding untranslated interface, wherein the translated implementation processes requests according to the translated interface. For example, a PERL interpreter is modified according to a translated PERL language interface, wherein keywords of the PERL language are translated and no longer correspond to standard PERL keywords, for example by replacing the standard PERL keyword "FOR" with a new translated keyword "XH5HKJ831H09L" for the translated PERL interpreter. In this embodiment, a PERL script will execute properly only if the script is in accordance with the translated PERL language interface.

In a second embodiment, an implementation of the corresponding untranslated interface is left unmodified. Instead, execution engine 106 translates requests (expressed according to a translated interface) to requests expressed in the corresponding untranslated interface. As an example, the PERL interpreter is left unmodified, and a PERL script in accordance with the translated interface undergoes a reverse translation before it is handed over to the PERL interpreter for interpretation. Note that in both embodiments, if the interface implementation itself uses any translated interfaces ("secondary interfaces"), then the interface implementation itself is translated according to the translated secondary interfaces. For example, if the PERL interpreter uses the system call interface provided by the operating system of computer 102, and if computer 102 is in a solidified state wherein the system call interface is translated, then the PERL interpreter (whether modified according to the first embodiment or left unmodified according to the second embodiment) is itself translated according to the system call interface translation present on computer 102. As should be obvious to one of ordinary skill in the art, any number of levels of translated interfaces are possible in a solidified computer 102, depending on whether an interface implementation uses translated secondary interfaces or not.

The abstraction of name space translation extends to a third embodiment, comprising verifying a checksum for deciding whether or not to execute a piece of software on computer 102. In this embodiment, a piece of software is regarded as its own "service" having an interface comprising a name space with a single entry, namely a name for the piece of software itself. During a solidification process of computer 102, a checksum is associated with the piece of software, wherein this association effectively represents a translation of the single entry in the name space. Subsequently, when computer 102 receives a request to execute the software, computer 102 executes the software only if the checksum properly verifies (corresponding to provision of the correct translation of the single entry), and refuses to execute the software otherwise. The checksum verification essentially represents a verification that the request to execute the software was according to the translated interface (indicating the software and associated checksum), as opposed to according to the untranslated interface (indicating the software without checksum). This embodiment can be implemented without the use of sdiffs. This embodiment can also be implemented without the use of a mapping table 103, replacing the mapping table 103 lookup with a checksum verification step making use of a mapping which maps pieces of software (requested for execution) to (a) a valid checksum, leading to grant of execution, or to (b) an invalid checksum (including null) leading to a refusal of execution.

A name space translation T 105 may be uniquely associated with a particular piece of software S and with a particular solidified system 102, or it may be shared by more than one piece of software or across more than one solidified system 102. Some techniques for translating an interface and associating such a translated interface with a piece of software are described in copending US patent application entitled "Damage Containment By Translation", application Ser. No. 10/651,588, filed on Aug. 29, 2003, incorporated herein by reference, and in copending US patent application entitled "Method And System For Containment Of Usage Of Language Interfaces", application Ser. No. 10/739,230, filed on Dec. 17, 2003, incorporated herein by reference.

In addition to solidifying code portions of the installed software base through name space translation (as described above), one or more configuration data of the installed software base can be solidified as well, independently from the corresponding code portions. This is accomplished by generating a translation of a set of configuration data used by the software. For example, consider a piece of software S which reads and/or writes configuration data using one or more data files, wherein the read and/or write operations rely on a knowledge of the corresponding file names. Solidifying some or all of the configuration data comprises translating the corresponding file names and/or translating the actual data contained in the files. Such files with translated names and/or translated content will be usable to a properly translated piece of software S', but not to the original untranslated software S. Proper software translation comprises static replacement of the original file names in S' with translated file names, and/or insertion of instructions (hooks) into S' for dynamically obtaining the translated file names and translated content during run-time. As should be obvious to one of ordinary skill in the art, this translation technique is not limited to configuration data residing in a file system, but can be analogously applied to configuration data accessible through any API or service interface, by translating the API or service interface and/or translating the content available through the API or service interface.

As described above, managing the executable software set of computer 102 comprises managing (a) the set of sdiffs, (b) mapping table 103, and (c) the mode ("restricted mode" versus "unrestricted mode") of the runtime environment of computer 102, hereinafter also collectively referred to as the "solidification metadata". It is an advantageous aspect that these three items can be independently managed and computed, locally or remotely, as described in the following:

sdiffs: In one embodiment, sdiffs are computed locally on computer 102. In an alternative embodiment, sdiffs are computed remotely on integrity server 101 and then sent to computer 102. Preferably, sdiffs sent from integrity server 101 to computer 102 are authenticated (for example using digital signatures) or are sent over a secure communications channel (for example via a Secure Socket Layer (SSL)).

Mapping table 103: In one embodiment, mapping table 103 is computed locally on computer 102, with any recomputations (for regenerating or adding name space translations 105) also performed locally. In an alternative embodiment, mapping table 103 is computed remotely on integrity server 101 and then sent to computer 102. Preferably, a mapping table 103 sent from integrity server 101 to computer 102 is authenticated (for example using digital signatures) or is sent over a secure communications channel (for example via SSL).

Mode: In one embodiment, switching from the "restricted mode" to the "unrestricted mode" (or vice versa) is initiated locally on computer 102. In an alternative embodiment, such a switch can only be initiated remotely by integrity server 101, such initiation using authentication (for example using digital signatures) or proceeding over a secure communications channel (for example via SSL).

Optionally, a checksum (as described above for deciding whether or not to execute a piece of software on computer 102) may be included as part of the solidification metadata.

To achieve modularity, the writing and reading of the sdiffs, the mapping table 103 and the runtime mode are separated between a writer module and a reader module, with the writer module writing said data onto computer 102 and the reader module retrieving written data when needed. In the embodiments where the computation of said data is performed locally, the writer module resides on computer 102, whereas remote computation of said data comprises a remote writer module communicating with computer 102, using authentication (for example digital signatures) or a secure communications channel (such as SSL). In an optional embodiment, such a remote writer module does not write all of said data, but instead writes a (possibly empty) subset thereof (e.g. the mode only) as well as one or more authenticators for validating the entire data. Such authentication may comprise digital signatures, transport-level authentication such as SSL, or any other authentication mechanisms.

Remote management of the solidification metadata by integrity server 101 results in the advantageous aspect that knowledge of the specific unique structure and encoding of the solidification metadata used to enforce a frozen executable software set on computer 102 resides with integrity server 101 and outside of computer 102. As a consequence, while a party other than integrity server 101 may be able to install additional software on frozen system 102, such software remains unexecutable until one or more items in the solidification metadata are properly modified by the integrity server 101 (or their local modification is authorized by integrity server 101) so as to enable the additional software to properly execute on frozen system 102, as described above. For example, in one embodiment, the integrity server 101 generates a modified mapping table 103 and sends it to computer 102. In another embodiment, the integrity server 101 sends data to computer 102, the data for locally generating a new mapping table 103 on computer 102. In both embodiments, it is an advantageous aspect that the knowledge, possessed by the integrity server 101 and used to construct or modify a mapping table 103 for a computer 102, is distinct from the knowledge of the actual name space translations 105 of the mapping table 103.

It is an advantageous aspect that tampering with the solidification metadata is rendered detectable. To accomplish this, solidification metadata resident on computer 102, solidification metadata sent by the integrity server 101 to computer 102, and/or data sent by the integrity server 101 for locally generating one or more portions of the solidification metadata on computer 102, are authenticated. Such authentication comprises for example digitally signing the solidification metadata (or transmitted portions thereof) and the data, or using other data integrity techniques (such as checksums) or authentication techniques as should be obvious to one of ordinary skill in the art. Correspondingly, computer 102 verifies authenticity and/or integrity of the solidification metadata, or of the data received from integrity server 101 for locally generating solidification metadata (or portions thereof), prior to using the solidification metadata or the data. One example comprises the execution engine 106 refusing to execute software if the solidification metadata have been tampered with. Another example comprises computer 102 refusing to update the solidification metadata if data received from integrity server 101 is not successfully authenticated. In another example, integrity server 101 verifies authenticity and integrity of the solidification metadata, and replaces any compromised portions of the solidification metadata (such as a compromised mapping table 103) with freshly generated ones.

Optionally, one or more portions of the solidification metadata on the frozen system 102 are periodically regenerated (with new name space translations) for increased defense against guessing attacks. Process migration techniques can be used to change one or more name space translations 105 associated with a process while the process is executing.

Optionally, the translated name spaces need not be persistently stored on frozen system 102, but can instead be computed when frozen system 102 powers up, and recomputed at any later times.

It is another advantageous aspect that when modifying a piece of software already resident on frozen system 102, or when installing a new piece of software onto frozen system 102, the integrity server 101 need not perform the actual modification or installation (although optionally the integrity server 101 can perform such tasks). The integrity server 101 simply properly modifies the solidification metadata, leaving the modification or installation of software to other parties, such as (a) a user or an administrator of frozen system 102, or (b) an automatic software modification or installation process. However, a modified or newly installed piece of software does not properly execute on the frozen system 102 unless the solidification metadata are appropriately modified by the integrity server 101 and the piece of software is translated according to the mapping table 103 (as described above).

Note that the "software maintenance" state may be further refined to comprise any number of individual interfaces, or groups of interfaces, by adding appropriate columns to the table of FIG. 4. For example, a useful state may distinguish between application configuration data and system configuration data, thereby separating system maintenance mode (for changing system configuration data) from application maintenance mode (for changing application configuration data). Another useful state ("software installation state") may comprise an untranslated system call interface while leaving other interfaces translated. This state would be useful for running software installers which do need the system call interface to execute properly. After an installer has completed installation of a software (and optionally removal of old versions of the software from computer 102), computer 102 transitions into a state where the system call interface again is solidified (i.e. translated). Note that any thusly installed software still undergo translation in order to properly execute on solidified computer 102. In general, it is an advantageous aspect that code execution and system administration on a system 102 can be separated to any desired degree by choosing a set of independent interfaces so as to provide sufficient granularity for generating a large enough set of possible states of computer 102.

With respect to persistent computer 102 data (such as configuration files, software instruction (code) files, dynamic libraries, operating system registries, etc.) to which the operating system of system 102 provides one or more interfaces for modifications, an optional embodiment allows writes even in a solidified state. However, as in a logging (or journaling) file system, such writes are merely logged and pending, and not yet committed. Once a user of solidified computer 102 has performed one or more changes (i.e. pending write operations), the user may request that the integrity server 101 (or an administrator thereof) commit the user's changes to the solidified computer 102. The integrity server 101 (or an administrator thereof) may then review the user's changes, and either accept all or part of the changes (by committing the accepted changes), reject all or part of the changes (by rolling back the rejected changes), and/or leave all of part of the changes for later inspection.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

I claim:

1. A method, comprising:

receiving a request for executing an original software program within a plurality of software programs on a first computer, the original software program comprising a first one or more references corresponding to one or more original calling names associated with the original interface, wherein a set of data is received from a second computer over a network at the first computer that includes the original interface, wherein the second computer authorizes modifications to the plurality of software programs being executed on the first computer, and wherein a new software program downloaded by the first computer remains unexecutable until the second computer authorizes the new software program using a checksum operation; and translating the original software program to obtain a translated software program, including replacing the first one or more references with a second one or more references corresponding to one or more translated calling names associated with a translated interface, wherein the one or more translated calling names are invalid for calling the original interface, and reverse translating the translated software program to obtain a reverse translated software program, the reverse translated software program not being executable as the original software program if the translated software program comprises additional references corresponding to the one or more original calling names prior to the reverse translation, and wherein at least a portion of the translated calling names are not mapped to a corresponding unique name in an original name space, and wherein a calling name space translation is larger than the original name space; and communicating enabling data to the first computer, wherein the first computer includes additional software that is unexecutable due to the translating activities, and wherein the enabling data is configured to be used by the first computer to enable the additional software to execute.

2. The method of claim 1, wherein the original interface comprises a language interface provided by a language interpreter residing on the first computer.

3. The method of claim 1, wherein a first checksum is associated with one of the translated software programs, such that upon a request for execution of one of the translated software programs, a second checksum is computed for the one of translated software programs, further wherein the translated software program is executed when the second checksum matches the first checksum and is not executed when the second checksum does not match the first checksum.

4. The method of claim 3, wherein the first checksum is generated or approved by a second computer.

5. A method, comprising:

receiving a set of data from a first computer over a network at a second computer, wherein the first computer authorizes modifications to a plurality of software programs being executed on the second computer, and wherein a new software program downloaded by the second computer remains unexecutable until the first computer authorizes the new software program using a checksum operation;

generating a calling name space translation on the second computer according to the set of data, wherein one or more original calling names associated with an original interface are translated into one or more translated calling names associated with a translated interface, translating an original software program of the plurality of software programs to obtain a translated software program, the original software program comprising a first one or more references corresponding to the one or more original calling names, wherein the translating includes replacing the first one or more references with a second one or more references corresponding to the one or more translated calling names, wherein the one or more translated calling names are invalid for calling the original interface, reverse translating the translated software program to obtain a reverse translated software program, the reverse translated software program not being executable as the original software program if the translated software program comprises additional references corresponding to the one or more original calling names prior to the reverse translation, and wherein at least a portion of the translated calling names are not mapped to a corresponding unique name in an original name space, and wherein the calling name space translation is larger than the original name space.

6. The method of claim 5, further comprising verifying that the set of data comprises a valid digital signature.

7. The method of claim 5, further comprising storing the calling name space translation on the second computer.

8. A method, comprising:

sending, by an administrative server, a set of data to a computer over a network, wherein the administrative server authorizes modifications to a plurality of software programs being executed on the computer, and wherein a new software program downloaded by the computer remains unexecutable until the administrative server authorizes the new software program using a checksum operation;

generating a calling name space translation on the computer according to the set of data, wherein one or more original calling names associated with an original interface are translated into one or more translated calling names associated with a translated interface, translating an original software program of the plurality of software programs to obtain a translated software program, the original software program comprising a first one or more references corresponding to the one or more original calling names, wherein the translating includes replacing the first one or more references with a second one or more references corresponding to the one or more translated calling names, wherein the one or more translated calling names are invalid for calling the original interface, and reverse translating the translated software program to obtain a reverse translated software program, the reverse translated software program not being executable as the original software program if the translated software program comprises additional references corresponding to the one or more original calling names prior to the reverse translation, and wherein at least a portion of the translated calling names are not mapped to a corresponding unique name in an original name space, and wherein the calling name space translation is larger than the original name space; and communicating enabling data to the computer, wherein additional software in the computer is unexecutable due to the translating activities, and wherein the enabling data is configured to be used by the computer to enable the additional software to execute.

9. The method of claim 8, further comprising digitally signing the set of data prior to sending the set of data.

10. Computer readable media, comprising:

an original calling name space associated with an original interface, wherein a set of data is received from a first computer over a network at a second computer that includes the original calling name space, wherein the first computer authorizes modifications to a plurality of software programs being executed on the second computer, and wherein a new software program downloaded by the second computer remains unexecutable until the first computer authorizes the new software program using a checksum operation;

a translated calling name space residing in the second computer and comprising a name space translation of the original calling name space, wherein one or more original calling names associated with the original calling name space are translated into one or more translated calling names associated with the translated calling name space, and a data structure including one or more sequences of instructions for translating an original software program to obtain a translated software program, wherein the original software program comprises a first one or more references corresponding to the one or more original calling names, wherein the one or more sequences of instructions includes replacing the first one or more references with a second one or more references corresponding to the one or more translated calling names, wherein the second one or more translated calling names are invalid for calling the original interface, and wherein the translated software program is reverse translated to obtain a reverse translated software program, the reverse translated software program not being executable as the original software program if the translated software program comprises additional references corresponding to the one or more original calling names prior to the reverse translation, and wherein at least a portion of the translated calling names are not mapped to a corresponding unique name in an original name space, and wherein the calling name space translation is larger than the original name.

11. The method of claim 1, wherein the original interface comprises a set of one or more system calls provided by an operating system of the first computer.

12. The method of claim 1, further comprising executing the translated software program on the first computer.

13. The method of claim 12, wherein the executing step comprises:

passing one or more requests to an implementor of the original interface, the one or more requests as represented by the first one or more references.

14. The method of claim 12, wherein the executing step comprises passing one or more requests to an implementor of the translated interface, the one or more requests as represented by the second one or more references.

15. The method of claim 1, wherein a first checksum is associated with the original software program, and further comprising:

computing a second checksum for the translated software program;

executing the translated software program on the first computer when the second checksum matches the first checksum; and refusing to execute the translated software program on the first computer when the second checksum does not match the first checksum.

16. The method of claim 15, wherein the first checksum is generated or approved by a second computer.

17. The method of claim 1, wherein a second computer controls the translating.

18. The method of claim 1, wherein the original interface is text based and wherein the translated interface is text based.

* * * * *